US007526581B2

(12) United States Patent
Omotani

(10) Patent No.: US 7,526,581 B2
(45) Date of Patent: Apr. 28, 2009

(54) IMAGE FORMING APPARATUS AND METHOD FOR CONTROLLING THE SECURITY OF AN EXCHANGEABLE PART

(75) Inventor: Toshikatsu Omotani, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 546 days.

(21) Appl. No.: 10/934,595

(22) Filed: Sep. 7, 2004

(65) Prior Publication Data

US 2005/0100376 A1 May 12, 2005

(30) Foreign Application Priority Data

Sep. 4, 2003 (JP) ............................ 2003-313291

(51) Int. Cl.
*G06F 3/00* (2006.01)

(52) U.S. Cl. .......................... 710/15; 702/150; 713/189

(58) Field of Classification Search ............... 710/1-74; 348/207-232; 386/101; 396/452; 347/19; 327/41; 455/555; 382/100
See application file for complete search history.

(56) References Cited

U.S. PATENT DOCUMENTS 4,777,537 A * 10/1988 Ueno et al. ................. 386/101
5,003,597 A * 3/1991 Merkle ......................... 380/37
5,016,093 A * 5/1991 Yoshida ................... 348/224.1
5,430,518 A * 7/1995 Tabata et al. ................ 396/452
5,673,070 A * 9/1997 Nakanishi et al. ............. 347/19
5,736,873 A * 4/1998 Hwang ........................ 327/41
5,995,849 A * 11/1999 Williams et al. ............ 455/555
6,603,864 B1 * 8/2003 Matsunoshita .............. 382/100
6,888,574 B1 * 5/2005 Asakura ..................... 348/372

FOREIGN PATENT DOCUMENTS

JP 2002-236571 8/2002

* cited by examiner

*Primary Examiner*—Henry W. H. Tsai
*Assistant Examiner*—Elias Mamo
(74) *Attorney, Agent, or Firm*—Oblon, Spivak, McClelland, Maier & Neustadt, P.C.

(57) ABSTRACT

An image forming apparatus, includes a memory and a processor. The memory stores a maintenance ID of an exchangeable part that can be attached to and detached from the main body of the apparatus, and storing information with regard to the exchangeable part. The processor reads out the maintenance ID of the exchangeable part from the memory, encrypts information relating to the exchangeable part stored in the memory and decrypts information encrypted by the processor. The processor also identifies whether decrypting information is necessary based on the maintenance ID read out by the ID reading unit or not.

2 Claims, 6 Drawing Sheets

IMAGE FORMING APPARATUS AND METHOD FOR CONTROLLING THE SECURITY OF AN EXCHANGEABLE PART

BACKGROUND OF THE INVENTION

1. Field of the Invention

The present invention relates to an image forming apparatus, and more particularly, to an image forming apparatus capable of controlling the security of internal data of an exchangeable part that can be attached and detached to and from the main body of the apparatus, and a control method.

2. Discussion of the Background

In recent years image forming apparatuses are connected to a Local Area Network (LAN) or a Wide Area Network (WAN) such as the Internet. Thus, various image forming apparatuses such as a copier machine, a scanner and a printer are more likely to be connected to each other through a network. In this environment, it is proposed that print data designated for security protection be guarded by encrypting transmitted data output by a host PC, decoding ciphered print data and printing out the decoded data based on an ID number input by a user for a print request. A system and method for providing this security feature is disclosed in Japanese Laid-Open Application NO. 2002-236571. However, the present inventor has recognized problems with the system of this application.

First, the process of encrypting or decrypting during data communication requires extra steps for performing such encrypting and decrypting. As a result, there was a problem in that the processing time for performing a print operation, for example, became long.

In addition, for example, in an image forming apparatus such as a copier machine forming images by electro-photographic processes, a part such as a photoreceptor or a toner cartridge is provided as an exchangeable part in the form of a process cartridge. Necessary and/or useful information for the image forming process may be stored in a memory loaded in the process cartridge. Such necessary information may also be stored in a removable hard drive device (HDD) attached to the image forming apparatus.

In such an image forming apparatus, a memory device provided in a user's exchangeable part such as a HDD or a process cartridge may store data in need of security such as a user's personal data. When the exchangeable part is detached from the main body of the apparatus, there is a danger that unauthorized copying of data or falsification of data is easily done by a third person. Prior art encryption techniques have not addressed this problem.

SUMMARY OF THE INVENTION

In order to solve the above-discussed problems and/or other problems, according to an aspect of the present invention, an image forming apparatus, includes a processor and a memory configured to store a maintenance ID of an exchangeable part that can be attached to and detached from the main body of the apparatus, and also store information relating to the exchangeable part. The processor is configured to read out the maintenance ID of the exchangeable part from the memory, encrypt information relating to the exchangeable part stored in the memory, decrypt information encrypted by the processor, decryption of information is necessary based on the maintenance ID read out by the ID reading unit or not.

The processor may encrypt information relating to the exchangeable part stored in the memory in a stand-by state of the image forming apparatus. The processor may encrypt information relating to the exchangeable part stored in the memory when the exchangeable part is detached from the main body of the apparatus. The processor may also encrypt information relating to the exchangeable part stored in the memory when the power of the main body of the apparatus is cutoff. The processor may read out the maintenance ID of the exchangeable part from the memory when the exchangeable part is attached to the main body of the apparatus. The processor may also decrypt information encrypted by the processor in the memory before the image forming process starts. The processor may decrypt information encrypted by the processor in the memory when the exchangeable part is attached to the main body of the apparatus. The image forming apparatus may include a processor configured to notice the improper attachment of the exchangeable part when it is identified that the processor doesn't decrypt information, based on the maintenance ID of the exchangeable part read out by the ID reading unit. The exchangeable part may be a process cartridge.

According to anther aspect of the present invention, an image forming apparatus includes a memory configured to store a ID for specifying an exchangeable part that can be attached to and detached from the main body of the apparatus and storing classified information. A processor is configured to read out the ID of the exchangeable part from the memory, and encrypt the classified information stored in the memory based on the ID read out by the ID reading unit.

These and other objects, features and advantages of the present invention will become apparent upon consideration of the following description of the preferred embodiments of the present invention (taken in conjunction with the accompanying drawing(s)).

BRIEF DESCRIPTION OF THE DRAWING(S)

Various other objects, features and attendant advantages of the present invention will be more fully appreciated as the same becomes better understood from the detailed description when considered in connection with the accompanying drawing(s) in which like reference characters designate like corresponding parts throughout and wherein.

DETAILED DESCRIPTION OF THE INVENTION

Figure 1:
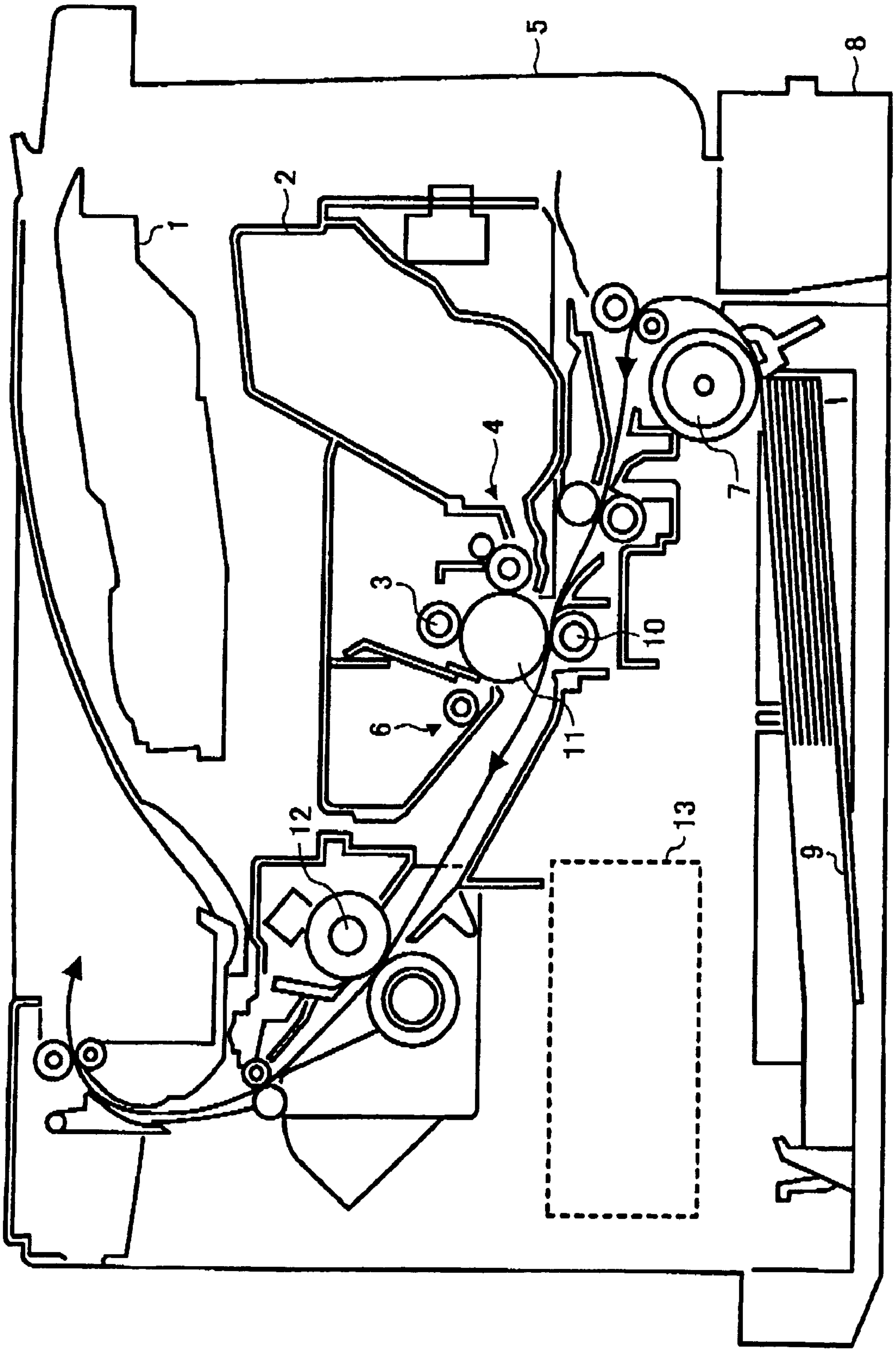
FIG. 1 is a diagrammatic illustration of an image forming apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

FIG. 1 is a diagrammatic illustration of an image forming apparatus 5 according to an exemplary embodiment of the present patent. The image forming apparatus 5 includes an process cartride2 which may be attached and detached to and from the main body of the image forming apparatus 5, a photoreceptor 11, an electrostatically charged roller 3, a cleaning device (not shown), a used toner recovery device 6, a developing device and a toner housing 4. An optical system 1 includes a polygon motor, a polygon mirror, a Fθ lens, a laser diode, and a mirror.

A recording paper 9 stored in a cassette 8 fed by a paper feed roller 7 is conveyed to the photoreceptor 11. The Photoreceptor 11 is rotated clockwise, and its surface is electrostatically charged by the electrostatically charged roller 3.

Based on print data output from a control device 13, laser light is irradiated from the optical system 1 to form an electrostatic latent image on the photoreceptor 11. The electrostatic latent image is visualized when it goes through the developing device and the toner housing 4. A visible image is transferred to the recording paper 9 carried toward the photoreceptor 11 by a transcription roller 10. The recording paper 9 is then transferred to a fixing roller 12, where a visible image is fixed on the recording paper 9. The recording paper 9 is then carried out of the image forming apparatus 5.

Figure 2:
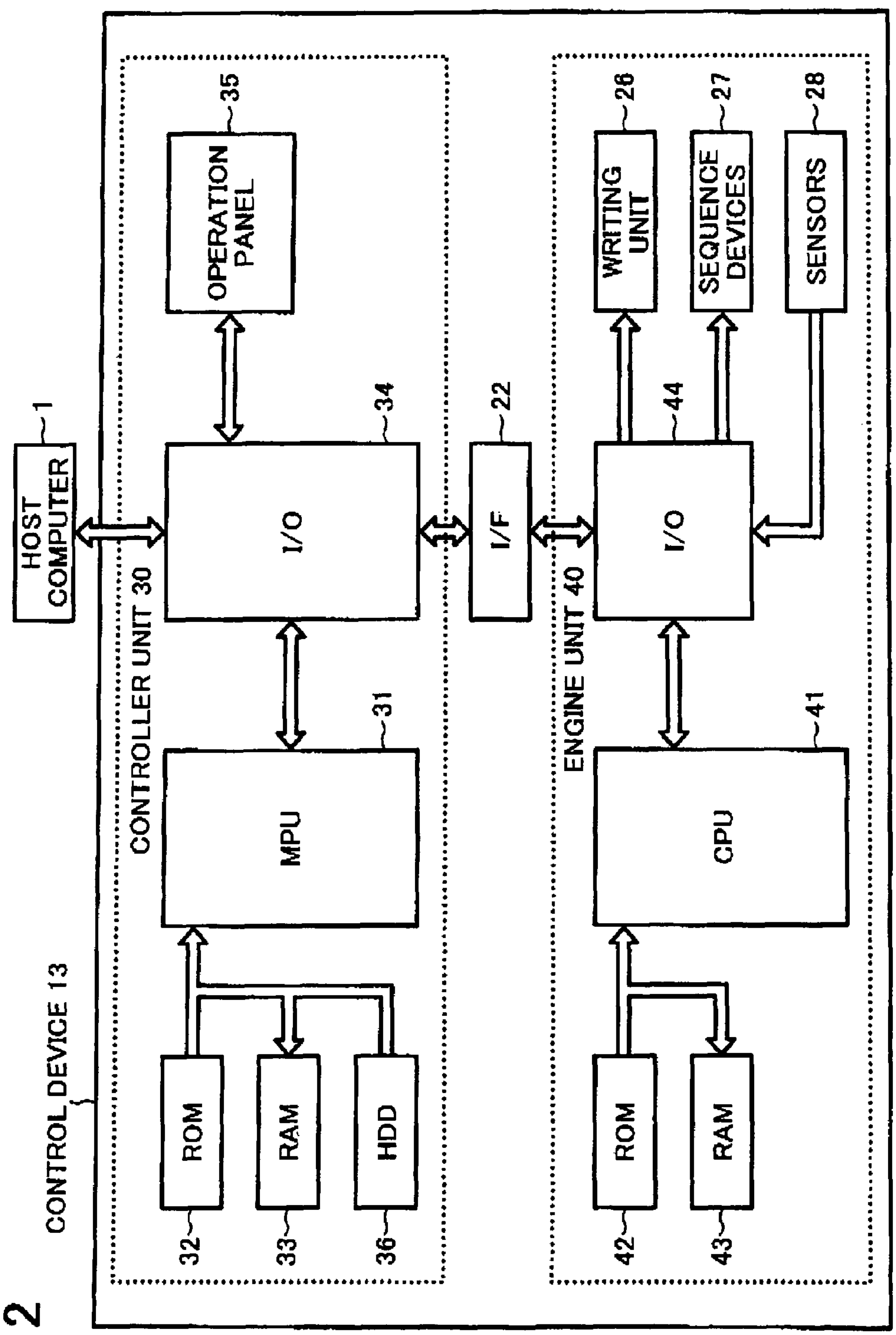
FIG. 2 is a block diagram illustrating an exemplary controller unit of the image forming apparatus for FIG. 1.

FIG. 2 is a block diagram illustrating a control device 13 of the image forming apparatus 5. The control device 13 includes a controller unit 30, an engine unit 40, an internal interface (I/F) 22. The control device 13 receives print data transferred from a host computer 1 (hereafter "Host"). The controller unit 30 expands received print data to per-page bitmap data. Furthermore, the controller unit 30 converts this bitmap data to video data that is dot information, and transfers this bitmap data to the engine unit 40 through the I/F22. In addition, the controller unit 30 makes the engine unit 40 form a visible image by sequential control.

The controller unit 30 includes a processing unit (MPU) 31 and a software program that the MPU 31 executes, a ROM 32 that stores numerical constant data, character font data and so on, and a RAM 33 that stores general data, dot patterns data and so on. Also included is a HDD (Hard Disk Drive) 36 capable of storing bulk data, which may be attached and detached to and from the main body of the image forming apparatus 5, an I/O 34 that controls data input/output, and an operation panel 35 that is connected to the MPU 31 through the I/O 34. The above-mentioned components are connected to each other through a data bus, an address bus, or a controller bus and so on. The Host 1 and the I/F 22 are connected to the MPU 31 through the I/O 34.

The engine unit 40 includes a CPU 41, a ROM 42 which stores a program executed by the CPU 41, numerical constant data and so on, a RAM43 that temporarily stores data, and a I/O 44 that controls data input/output. The above-mentioned components are connected to each other through a data bus, an address bus, a controller bus and so on. The I/O 44 is connected to the I/F 22. The I/O 44 inputs video data received from the controller unit 30, and modes of various types of switches of the operation panel 35 to the other components of the engine unit 40. Furthermore, the I/O 44 outputs image clock (WCLK) and status signals indicating the paper end to the controller unit 30. The I/O 44 is connected to a writing unit 26, various types of sequence devices 27, and various types of sensors 28.

The controller unit 30 receives a command of print order and print data about character data or image data from the Host 1. The controller unit 30 converts character data to dot patterns necessary for image writing the character fonts stored in the ROM 32, and expands bitmap data of the character and the image (hereafter collectively called "image") to the video RAM area in the RAM 33 per page. Furthermore, when the image clock (WCLK) with ready signal is input from the engine unit 40 to the controller unit 30, the controller unit 30 outputs bitmap data expanded in the video RAM area in the RAM 33 as video data in synchronization with the image clock (WCLK) to the engine unit 40 through the I/F 22. In addition, the operation panel 35 includes a switch and an indicator (not shown). The controller unit 30 controls data by the instruction of an operator, displays a situation of the apparatus on the indicator by transmitting the control data to the engine unit 40.

The engine unit 40 receives dot-corrected input video data from the controller unit 30 through the I/F 22. The engine unit 40 outputs video data used for image writing process to the writing unit 26 by controlling the writing unit 26 and the sequence devices 27. Furthermore, the engine unit 40 processes component condition signals received from the sensors 28, and outputs information or status signals indicating an error situation (such as paper out) through the I/F 22 to the controller unit 30.

The HDD 36 stores a maintenance ID. Data input/output to and from the HDD 36 is done by the MPU 31. The maintenance ID is, for example, a number set for identifying an exchangeable part such as the HDD 36 or process cartridge 2. Furthermore, the HDD 36 stores at least one classified information, such as internal information of an exchangeable part, personal security information or maintenance information of an image forming apparatus. The maintenance information is, for example, information about a service provider of an image forming apparatus, manufacturer or sales company of an image forming apparatus, manufacturing information of an image forming apparatus (for example, a production lot number, a date of manufacture, a manufacturing facility), usage history of an image forming apparatus (for example, an operating time, a total number of handout, a number of toner refill, a number of recycle), and so on. However, classified information is not limited to the above-mentioned information.

Figure 3:
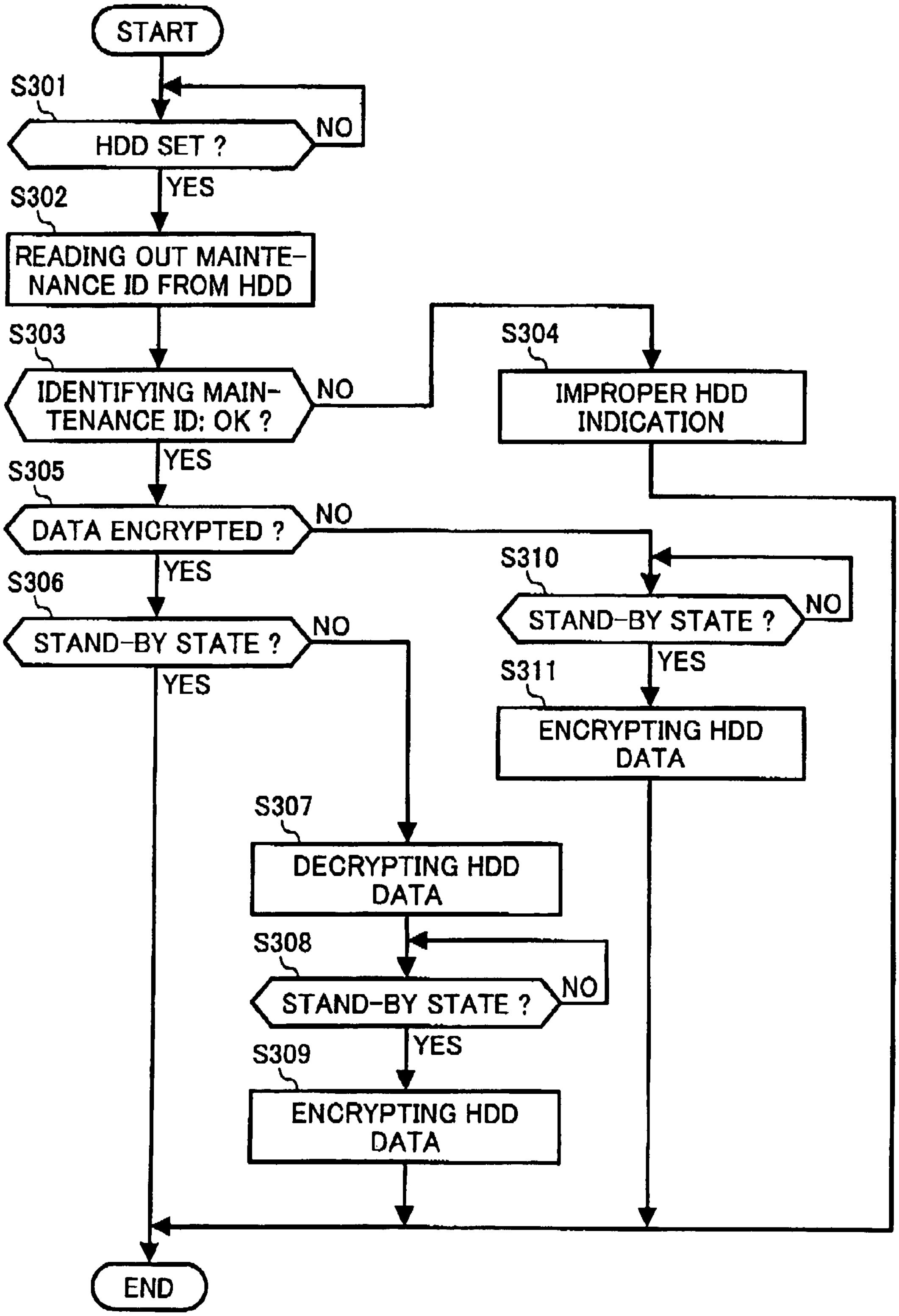
FIG. 3 is a flowchart illustrating an encrypting process and a decrypting process according to a first embodiment of the present invention.

FIG. 3 is a flowchart illustrating an encrypting process and a decrypting process according to a first embodiment of the present invention. Each flow of FIG. 3 is executed by the MPU 31 of the controller unit 30 in the image forming apparatus 5. On the condition that the HDD 36 is attached to the controller unit 30, the image forming process is executed. After that, when the image forming apparatus 5 is in a stand-by state or in an energy saving state, the MPU 31 encrypts data stored in the HDD 36 by identifying a maintenance ID. Whether the image forming apparatus 5 is in a stand-by state or not is determined as follows. For example, the CPU 41 of the engine unit 40 can determine whether or not there is movement of the writing unit 26. Next the MPU 31 of the controller unit 30 determines whether the apparatus is in the standby state based on the data received from the CPU 41.

Furthermore, the MPU 31 of the controller unit 30 can determine whether the image forming apparatus 5 is in an energy saving state or not. Specifically, when a print order is not input for more than a predetermined amount time, the apparatus state is transferred to an energy saving state. Then a device consuming a lot of electricity (for example, a fixation heater) is controlled to reduce its electricity in an energy saving state. The MPU 31 identifies whether the image forming apparatus 5 is in an energy saving state or not.

On the other hand, when the image forming apparatus 5 is in the state of starting image forming process again, the MPU 31 recognizes the state and decrypts encrypted information stored in the HDD 36. In addition, in the case that HDD 36 is separated into some partitions and one partition storing classified information is identified, the MPU 31 may encrypt or decrypt information stored in one specific partition.

As seen in FIG. 3, the MPU 31 of the controller unit 30 first determines whether the HDD 36 is set to (i.e. attached to) the image forming apparatus 5 or not (step S301). When the MPU 31 confirms that the HDD 36 is set to the image forming apparatus 5, the MPU 31 reads out a maintenance ID stored in the HDD 36 (step S302).

The MPU 31 recognizes the maintenance ID, and identifies whether data stored in the HDD 36 is encrypted or not (step S303). If the MPU 31 doesn't identify the maintenance ID, the MPU 31 recognizes that a different HDD is attached to the image forming apparatus 5, and shows an improper HDD indication on the operation panel 35. Furthermore, the MPU 31 ends the present sequence, and prohibits the print operation (step S304). On the other hand, when the MPU 31 identifies the maintenance ID, the MPU 31 recognizes whether the HDD 36 is encrypted or not (step S305) When the MPU 31 recognizes the HDD 36 is encrypted, the MPU 31 determines whether the image forming apparatus 5 is in a stand-by state or not (step S306) as discussed above. The MPU 31 leaves the image forming apparatus 5 as it is as long as it is in a stand-by state, and decrypts data stored in the HDD 36 when a print order is recognized (step S307). Furthermore, when the MPU 31 recognizes the image forming apparatus 5 is in a stand-by state again after the print order is executed, the MPU 31 encrypts data stored in the HDD 36 (step S308, S309).

In step S305, when the MPU 31 recognizes data stored in the HDD 36 is not encrypted, the MPU 31 determines whether the image forming apparatus 5 is in a stand-by state as discussed above, and encrypts data stored in HDD 36 (step S310, S311) when the apparatus is in a standby state.

When the MPU 31 of the main body of the image forming apparatus 5 reads out the maintenance ID stored in the HDD 36, the MPU 31 investigates the past history information about encryption and decryption in the image forming apparatus 5 for the maintenance ID. The history information is, for example, information about the presence or the absence of encryption for each maintenance ID. The history information may be stored in a memory equipped with the image forming apparatus 5. The MPU 31 determines that data stored in the HDD 36 is encrypted data or decrypted data by using the history information. Therefore the maintenance ID is, for example, a unique number set each apparatus. In addition, the history information may be flag data configured to a flag 1 indicating the presence of encryption and a flag 2 indicating the absence of encryption, which are stored in the HDD 36 or other exchangeable device of the image forming apparatus. In this case, the ID number and flag data are not encrypted. On the other hand, classified information, other than the ID and flag data, stored in the HDD 36 is the object of data encryption.

In addition, in the first embodiment, the maintenance ID is stored in the HDD 36. However the maintenance ID may be stored in a memory such as an integrated circuit chip. In this case the integrated circuit chip may be placed anywhere on the HDD body, and an IC reader which reads out the maintenance ID stored in the integrated circuit chip may be set in the image forming apparatus 5.

As described above, as long as the image forming apparatus 5 is in a stand-by state or in an energy saving state, data stored in the HDD 36 may be encrypted. Thus even if a third person detaches the HDD 36 from the main body of the image forming apparatus 5 when in such a state, the third person cannot illegally copy data stored in the HDD 36.

FIG. 4 is a flowchart illustrating encrypting process and decrypting process according to a second embodiment of the present invention.

Figure 4A:
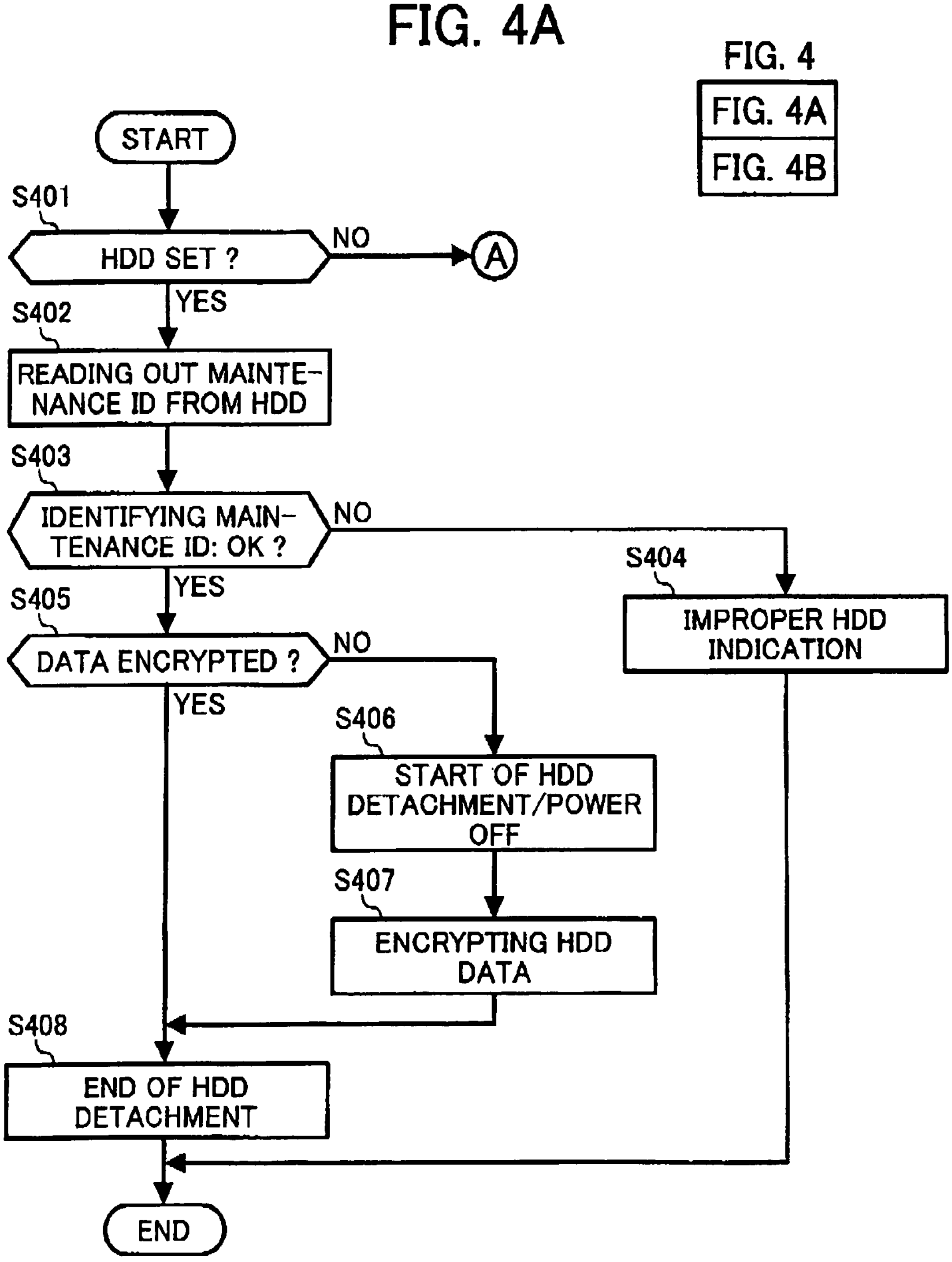
FIG. 4 is a flowchart illustrating encrypting process and decrypting process according to a second embodiment of the present invention.
Figure 4B:
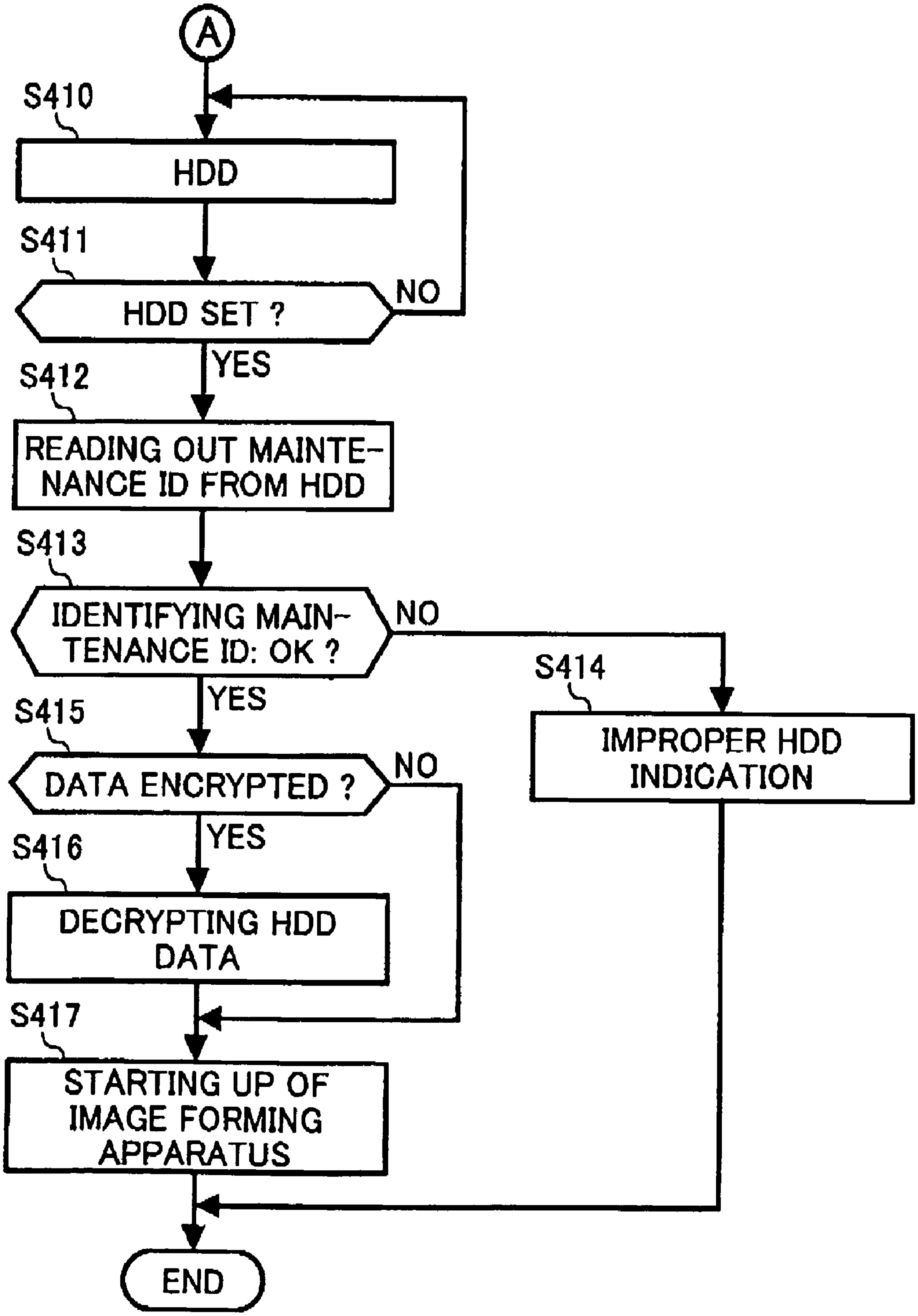

FIG. 4A shows the process of encrypting data stored in the HDD 36 in the case when the MPU 31 reads out a maintenance ID of the HDD 36 attached to the image forming apparatus 5 and recognizes that data stored in the HDD 36 is not encrypted, and when the HDD 36 is detached from the main body of the image forming apparatus 5 or when the power of the image forming apparatus 5 is cut off. Furthermore, in FIG. 4B, when the HDD 36 stored encrypted data is attached to the image forming apparatus 5, the flow of decrypting data stored in the HDD 36 by detecting the attachment is shown. The flow shown in FIG. 4 is executed by the MPU 31 of the controller unit 30 in the image forming apparatus 5 in analogy with the flow shown in FIG. 3.

As seen in FIG. 4A, the MPU 31 determines whether the HDD 36 is attached (i.e. set) to the image forming apparatus 5 (step S401). When the MPU 31 confirms that the HDD 36 is attached to the image forming appratus5, the MPU 31 reads out a maintenance ID stored in the HDD 36 (step S402). The MPU 31 then identifies the authenticity of the HDD 36 (step S403). Where the MPU 31 does not identify the maintenance ID, the MPU 31 recognizes an improper HDD is attached and shows an error message indicating an improper set on the operation panel 35 (step S404). The MPU 31 then ends the present sequence and prohibits a print operation on the apparatus. Where the MPU 31 identifies the maintenance ID, the MPU 31 then determines whether data stored in the HDD 36 is encrypted or not (step S405). If the MPU 31 recognizes that data stored in the HDD 36 is encrypted, the MPU 31 leaves the image forming apparatus 5 as it is. Thus, if the HDD 36 is detached from the image forming apparatus, the data stored in the HDD will remain encrypted.

In step S405, in case the MPU 31 recognizes that data stored in the HDD 36 is not encrypted, the MPU 31 encrypts data when the HDD 36 is detached from the image forming apparatus 5 or when the power of the image forming apparatus 5 is cut off (step S406, S407). Specifically, where the power of image forming apparatus 5 is switched off, encryption of data stored in the HDD 36 is achieved by reserved power supplied with the HDD 36 for a given length of time by making use of a condenser in the image forming apparatus 5. Moreover, where the HDD 36 is detached the image forming apparatus may be configured to detect imminent detachment before the detachment takes place. This maybe done by detecting movement of the HDD 36 or providing a sensor connector. However, other detachment sensing mechanisms may be used. Thus, in case the HDD 36 is detached from the image forming appratus5, data stored in the HDD 36 may be encrypted. Now therefore a third person cannot illegally copy data stored in the HDD 36.

In step S401, where the HDD 36 is not actually attached to the image forming apparatus 5, the MPU 31 recognizes that the HDD 36 is not attached to the image forming apparatus 5 (step S410). When the HDD 36 is later attached to the image forming apparatus, the MPU 31 detects that the HDD 36 is attached (step S411). Next, the MPU 31 reads out a maintenance ID from the HDD 36 (step S412). The MPU 31 recognizes the maintenance ID, and identifies the authenticity of the HDD 36 (step S413). When the MPU 31 does not identify the maintenance ID, the MPU 31 shows an error message indicating attachment of an improper device on the operation panel 35. The MPU 31 then ends the present sequence and prohibits print operation (step S414). On the other hand, when the MPU 31 identifies a maintenance ID, the MPU 31 identifies whether data stored in the HDD 36 is encrypted or not (step S415) by referring to the encryption/decryption history as previously described. When the MPU 31 recognizes that data stored in the HDD 36 is encrypted, the MPU 31 decrypts data in the HDD and starts up the image forming apparatus 5 (step S416, S417) as soon as the HDD is attached. In addition, step in S415, where the MPU 31 recognizes that data in the HDD 36 is not encrypted, the MPU 31 starts up the image forming apparatus 5 without performing a decryption step. In case where the HDD 36 is subsequently detached from the image forming apparatus 5 after the HDD 36 is attached to the image forming apparatus 5, encryption is executed by the process discussed with respect to FIG. 4A.

As discussed above, where data stored in the HDD 36 is encrypted, after the HDD 36 is attached to the image forming apparatus 5 decryption is executed immediately. Therefore, data may be decrypted before the image forming operation starts, thereby making it possible to shorten the processing time of communication between Host 1 and the image forming apparatus 5.

In the first and the second embodiments described above, by storing a maintenance ID in the HDD 36, encryption or decryption is executed by reading out the maintenance ID when the HDD 36 is attached to the image forming apparatus 5. The above-mentioned maintenance ID is, for example, a unique ID which is capable of being identified by the MPU 31 of the image forming apparatus 5.

In addition, the first and the second embodiments described above exemplify that an exchangeable part of the image forming apparatus 5 is a HDD 36 attached to the controller unit 30. However the exchangeable part is not limited to this. The exchangeable part may be a process cartridge 2, a feed cassette shown in FIG. 1 or other exchangeable device.

Figure 5:
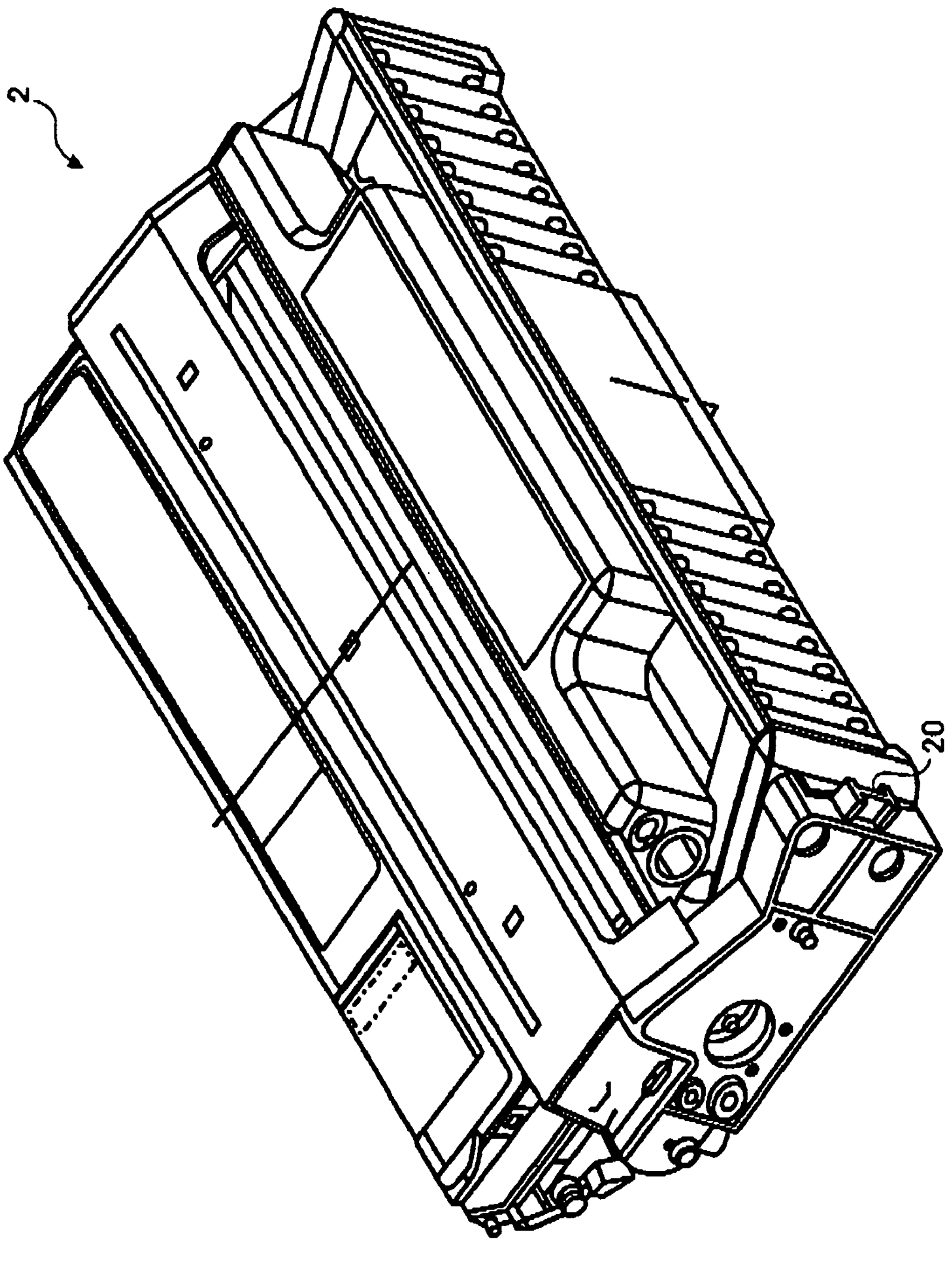
FIG. 5 is a diagrammatic perspective view of a process cartridge that may be attached to the image forming apparatus of FIG. 1.

FIG. 5 is a diagrammatic perspective view of a process cartridge 2 attached to image forming apparatus 5. The process cartridge 2 is a cartridge combined with the electrostatically charged roller 3, the developing device, the toner housing 4, the cleaning device and the used toner recovery device 6 and the photoreceptor 11. As seen in FIG. 5, the process cartridge 2 includes a memory tab 20 mounted thereon. The memory tab 20 includes a nonvolatile memory for storing information necessary or useful for controlling the process cartridge 2, as well as a maintenance ID of the process cartridge 2. The memory may also store the date of manufacture, the beginning date of use, a number of recycle, a number of copies, and/or the current date, and so on.

When the process cartridge 2 is attached to the image forming apparatus 5, the memory tab 20 is connected to the I/F 22 in the image forming apparatus 5. This enables the MPU 31 of the controller unit 30 to read out various information from the nonvolatile memory of the memory tab 20 or change this various data. In addition, instead of the memory tab 20, a printed board onboard an IC chip, or a noncontact IC chip may be implemented into the process cartridge 2. In this case, an IC reader is mounted in the image forming apparatus 5.

In addition, the image forming apparatus 5 may be, for example, an apparatus having a non-electronograph system such as an apparatus by the ink-jet system. In this case, an exchangeable part may be a ink cartridge, and similar processing becomes possible. In addition, the image forming apparatus 5 does not have to be a single structure body physically, and the image forming apparatus 5 may be a system including plural units.

The image forming apparatus 5 of the above mentioned embodiments may be applied to a printer, a facsimile device, a scanner, or a copy machine, and an image forming apparatus including some of a copy function, a facsimile function, and a scanner function. Furthermore, the image forming apparatus 5 may be applied to an electronics device such as a DVD recorder or a personal computer.

According to the above-described invention, it is possible to protect classified information for security purposes by encrypting data stored in an exchangeable part when the image forming apparatus 5 is in a stand-by state.

Furthermore, when an exchangeable part is detached from the image forming apparatus 5, data stored in an exchangeable part may be encrypted because the MPU 31 detects a time when the part is detached from the image forming apparatus and encrypts data stored in the exchangeable part such as the HDD 36. Therefore, it is possible to protect illegal copying and falsification by a third person, and raise the security level of data continued on the exchangeable part.

Furthermore, data stored in an exchangeable part may be encrypted in a case where the power of the apparatus is cut off while the exchangeable part is attached to the image forming apparatus 5. Therefore, it is possible to raise the security level in this situation.

Furthermore, when an exchangeable part is attached to the image forming apparatus 5, the MPU 31 detects the attachment and reads out a maintenance ID stored in the exchangeable part. From the maintenance ID it is determined whether decryption is necessary and allow such decryption before an image formation request is made. Therefore, it is possible to shorten the time of an image forming operation.

Still further, by decrypting encrypted data stored in an exchangeable part before the start of image forming operation, it is possible to reduce a step necessary for encryption and decryption, and to shorten the time of an image forming operation.

In addition, when an exchangeable part is attached to the image forming apparatus 5, the MPU 31 detects the attachment and decrypts encrypted data stored in the exchangeable part. Therefore, it is possible to raise the security level and shorten the time of an image forming operation.

Further, where a maintenance ID does not agree with a prescribed maintenance ID stored in an exchangeable part, an error message indicating an improper attachment is provided to a user. This allows the user to recognize that the exchangeable part is an unusable part.

Furthermore, the process cartridge 2 stores a maintenance ID and decryptable data in the memory of the process cartridge. Therefore, it is possible to manage appropriately the process cartridge including various process information, and to protect classified information as described above.

Having now fully described the invention, it will be apparent to one of ordinary skill in the art that many changes and modifications may be made thereto without departing from the spirit and scope of the invention as set forth therein.

This patent specification is based on Japanese priority patent applications, No. 2003-313291 filed on Sep. 4, 2003, the entire contents of which are hereby incorporated by reference.

What is claimed as new and desired to be secured by Letters Patent of the United States is:

1. An image forming apparatus, comprising:

an exchangeable part that can be attached to and detached from a main body of the apparatus, the exchangeable part including a memory configured to store a maintenance identification (ID) of the exchangeable part and to store information relating to the exchangeable part; and a processor configured to:

read out the maintenance ID of the exchangeable part from the memory, determine that the information relating to the exchangeable part stored in memory is encrypted information or decrypted information based on the maintenance ID read out by the processor, encrypt the information relating to the exchangeable part stored in the memory when it is determined that the information relating to the exchangeable part stored in memory is decrypted, and decrypt information encrypted by the processor when it is determined that the information relating to the exchangeable part stored in memory is encrypted, wherein encryption and decryption of information is performed by the processor in order to control the security of internal data of the exchangeable part when the exchangeable part is detached from the main body, and wherein the processor is further configured to:

detect whether the exchangeable part is in a process of being detached from the image forming apparatus, and encrypt the information relating to the exchangeable part stored in the memory when the processor detects that the exchangeable part is in the process of being detached from the main body of the apparatus but before such process of being detached is ended.

2. A method of controlling an image forming apparatus, comprising the steps of:

storing a maintenance identification (ID) of an exchangeable part that can be attached to and detached from a main body of the apparatus, and also storing information relating to the exchangeable part, in a memory of the exchangeable part;

reading out the maintenance ID of the exchangeable part from the memory;

determining that the information relating to the exchangeable part stored in memory is encrypted information or decrypted information based on the maintenance ID read out by the processor;

encrypting the information relating to the exchangeable part stored in the memory when it is determined that the information relating to the exchangeable part stored in memory is decrypted;

decrypting information encrypted by the encrypting step when it is determined that the information relating to the exchangeable part stored in memory is encrypted, wherein encryption and decryption is performed in order to control the security of internal data of the exchangeable part when the exchangeable part is detached from the main body, detecting whether the exchangeable part is in a process of being detached from the image forming apparatus; and encrypting the information relating to the exchangeable part stored in the memory when it is detected that the exchangeable part is in the process of being detached from the main body of the apparatus but before such process of being detached is ended.

* * * * *